Patented Sept. 24, 1935

2,015,579

UNITED STATES PATENT OFFICE 2,015,579

1-(PARAHYDROXYPHENYL)-2-METHYLAMINOPROPANE AND ITS ACID ADDITION SALTS

Gordon A. Alles, Monterey Park, Calif.

No Drawing. Application April 21, 1933, Serial No. 667,197

4 Claims. (Cl. 260—128)

This invention relates to a new chemical compound. The principal object of the invention is to provide a new chemical compound useful for therapeutic purposes.

The compound of my present invention consists of 1-(parahydroxyphenyl)-2-methylaminopropane, HO—$C_6H_4$—$CH_2$—CH($CH_3$)—$NHCH_3$, either alone or in combination with an acid as an addition salt. This 1-(parahydroxyphenyl)-2-methylaminopropane and its addition salts are physiologically active and produce effects in animals and man similar to those produced by ephedrine and its salts.

In a separate application filed by me of even date herewith, I have described 1-(paramethoxyphenyl)-2-methylaminopropane, alone or as a salt, and a method of making the same.

The method of making 1-(parahydroxyphenyl)-2-methylaminopropane, as the free base or in combination with an acid as a salt is preferably the demethylation of the oxygen atom in 1-(paramethoxyphenyl)-2-methylaminopropane, $CH_3O$—$C_6H_4$—$CH_2$—CH($CH_3$)—$NHCH_3$ by means of heating in concentrated acid solution. While several procedures are possible, involving different acids and times of heating, this demethylation can be carried out with constant boiling hydrobromic acid (48%) in water with good yield in the following manner:

One mol. of 1-(paramethoxyphenyl)-2-methylaminopropane, as the free base or as a salt such as the hydrochloride or hydrobromide, is dissolved with one liter of constant boiling aqueous hydrobromic acid solution (48%), and the mixture heated to boiling for four hours using a reflux condenser under atmospheric pressure. The water solution of the product, obtained by evaporation of the excess aqueous acid present, addition of water and decolorization with charcoal, is made alkaline with a concentrated aqueous sodium carbonate solution. The desired 1-(parahydroxyphenyl)-2-methylaminopropane is precipitated as a gummy material which soon solidifies. This solid can be crystallized from ethanol, alone or with the addition of ether or benzene, or may directly be converted into an addition salt by combining it with an acid.

The free base is a solid melting at 161–162° C. when pure and is not very soluble in ether or benzene. The salts with the halogen acids, the hydrochloride, hydrobromide or hydroiodide can be made but are not readily crystallizable. The neutral sulphate is crystallizable from water with the addition of ethanol and shows no melting point up to 285° C. A phosphate may also be prepared by mixing a half molecular amount of phosphoric acid with one molecular amount of the base, which crystallizes from water and ethanol and melts at 190° C. The citrate is not readily obtained crystalline but the acid tartrate, melting at 122–124° C., is prepared by mixing equal molecular amounts of the free base and tartaric acid in ethanol solution.

The free base or its addition salts are suitable for therapeutic purposes alone or in combination with other materials in solution and in liquid and solid mixtures.

I claim:

1. The chemical compounds 1-(parahydroxyphenyl)-2-methylaminopropanes of the group consisting of 1-(parahydroxyphenyl)-2-methylaminopropane and the acid addition salts of 1-(parahydroxyphenyl)-2-methylaminopropane.

2. The chemical compound 1-(parahydroxyphenyl)-2-methylaminopropane.

3. The chemical compounds consisting of acid addition salts of 1-(parahydroxyphenyl)-2-methylaminopropane.

4. The chemical compound, the neutral sulphuric acid addition salt of 1-(parahydroxyphenyl)-2-methylaminopropane.

GORDON A. ALLES.